United States Patent [19]

Van Scoy

[11] 4,085,192

[45] Apr. 18, 1978

[54] SELECTIVE REMOVAL OF HYDROGEN SULFIDE FROM GASEOUS MIXTURES

[75] Inventor: Robert W. Van Scoy, Missouri City, Tex.

[73] Assignee: Shell Oil Company, Houston, Tex.

[21] Appl. No.: 359,564

[22] Filed: May 11, 1973

[51] Int. Cl.² .............................................. B01D 53/34
[52] U.S. Cl. .................................. 423/226; 423/228; 423/573 R
[58] Field of Search ................. 423/232, 233, 226–229

[56] References Cited

U.S. PATENT DOCUMENTS

| | | | |
|---|---|---|---|
| 2,083,213 | 6/1937 | Baehr et al. | 423/228 |
| 2,638,405 | 5/1953 | Frazier | 423/228 |
| 3,266,866 | 8/1966 | Bally et al. | 423/229 |
| 3,463,603 | 8/1969 | Freitas et al. | 423/229 |

*Primary Examiner*—Earl C. Thomas

[57] ABSTRACT

Hydrogen sulfide is selectively removed from a hydrogen sulfide and carbon dioxide-containing gaseous mixture by contacting the gaseous mixture with a deep-stripped, hydrogen sulfide-selective, liquid absorbent in an absorption column having a maximum of 20 trays and a critically high average dry tray pressure drop per tray.

14 Claims, 1 Drawing Figure

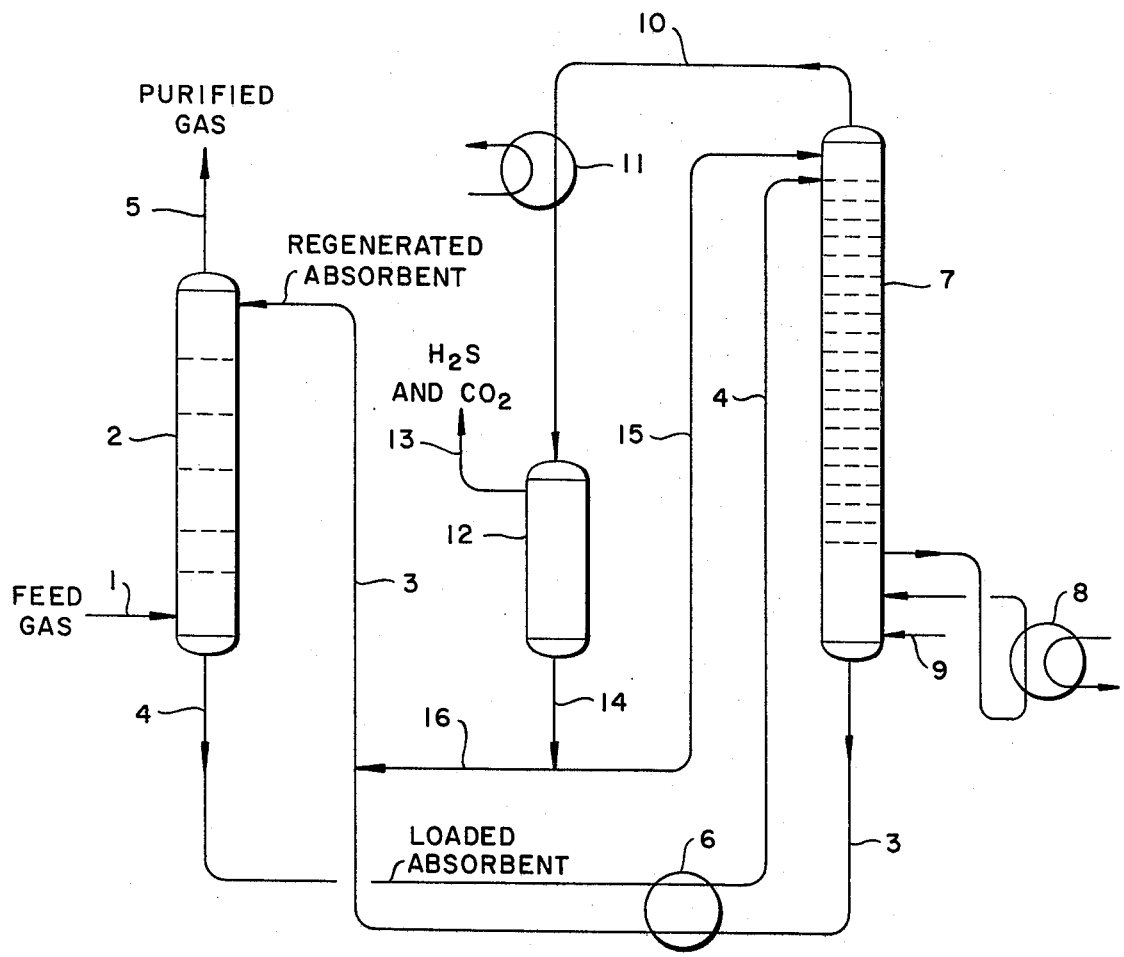

SELECTIVE REMOVAL OF HYDROGEN SULFIDE FROM GASEOUS MIXTURES

BACKGROUND OF THE INVENTION

1. Field of the Invention

The invention relates to a process for the selective removal of hydrogen sulfide from gaseous mixtures containing both hydrogen sulfide and carbon dioxide.

2. Discussion of the Prior Art

Processes for the removal of acidic gases such as hydrogen sulfide ($H_2S$) and carbon dioxide ($CO_2$) from gaseous mixtures containing the same are well known in the art. In general, these processes involve scrubbing the gaseous mixture with a liquid absorbent in an absorption zone whereby the acidic gases are removed from the gaseous mixture and a loaded absorbent stream is obtained which is passed to a regeneration zone where the absorbent is heated and/or stripped with solvent vapor, e.g., steam, resulting in the release of the acidic gases. The regenerated absorbent is returned into contact with the feed gas mixture in the absorption zone while the evolved acidic gases are passed to a cooler/condenser in which the solvent vapors are condensed and separated from the acidic gases.

While $H_2S$ removal to low concentrations is required in most commercial applications, there are a number of cases in which it is not necessary or desirable that carbon dioxide be removed from the gaseous mixture. For example, current pipeline specifications for natural gas permit relatively high concentrations of $CO_2$ in the product gas as compared to $H_2S$ which is restricted to very low levels. Thus by selectively removing $H_2S$ from natural gas, it is possible to treat larger quantities of gas for a given volume of liquid absorbent. In addition, a relatively concentrated $H_2S$ stream is obtained which is more readily processed into useful by-products such as sulfur or sulfuric acid.

Another application where selective $H_2S$ removal is desirable is in treating Claus plant off-gases, which typically contain $H_2S$, $S$, $SO_2$ and $CO_2$, by catalytically hydrogenating the residual sulfur compounds to $H_2S$. Such catalytic hydrogenation processes are described, for example in co-assigned U.S. Application Ser. No. 326,916, filed Jan. 26, 1973, and Canadian Pat. No. 916,898 to Beavon. After hydrogenation the reduced off-gases (tail gas) can be suitably contacted with an absorbent solution to remove $H_2S$ for recycle to the Claus plant. Since the presence of $CO_2$ in the gas eventually discharged to the atmosphere is not objectionable, it is desirable that the $CO_2$ removal in the absorption step be minimized to avoid having to recycle large quantities of $CO_2$ with the $H_2S$ which would entail the use of larger blowers, etc. and lead to undesirable accumulations of $CO_2$ in the system. Thus it is vitally important that $H_2S$ be selectively removed from the hydrogenated tail gas.

Still another application in which selective $H_2S$ removal is desirable is in treating acid gas feed streams to a Claus plant (to concentrate the $H_2S$), thereby facilitating its conversion to elemental sulfur in the Claus plant. Other instances where selective $H_2S$ removal is desirable is in the manufacture of dry ice and catalytic processes where a specific amount of $CO_2$, but no $H_2S$ is required.

A number of processes have been proposed to improve the selectivity of $H_2S$ relative to $CO_2$ in response to the aforementioned needs. Such processes by-and-large are based on either the known difference in the absorption velocity between $H_2S$ and $CO_2$, the choice of an absorbent known to have selective adsorption properties, or on the use of an absorbent liquid which is partially saturated with carbon dioxide thereby reducing its capacity to absorb further amounts of $CO_2$ and hence increase its selectivity for $H_2S$. An example of this latter type of process is that described in U.S. Pat. No. 3,266,866 to Bally et al. In the patented process $H_2S$ and $CO_2$ are selectively absorbed from a gaseous mixture in an aqueous absorbent solution of a dipropanolamine which is subsequently only partially regenerated so that from 0.02–0.5 moles of $CO_2$ per mole of dipropanolamine remain in the regenerated absorbent in the form of a carbamate. The use of the partially regenerated solvent in the absorption step was found to increase the selectivity of the absorbent for $H_2S$ relative to $CO_2$.

In processes for selectively removing $H_2S$ based on the difference in the absorption velocity of $H_2S$ relative to $CO_2$, $H_2S$ selectivity is generally improved by reducing the contact time between the absorbent and the $H_2S$ and $CO_2$-containing gaseous mixture, e.g., by increasing gas velocity or reducing the number of contacting stages. While the use of shorter contact times generally enhances $H_2S$ selectivity, such measures adversely affect the total amount of $H_2S$ removed and the use of very short contact times can result in unacceptably high $H_2S$ concentrations in the treated gas. Moreover, the flexibility of processes utilizing short contact times is severely limited because reduction of the acid gas load in the incoming gas stream will increase the contact time with a consequent decrease in selectivity, while an above-normal acid gas load will result in insufficient acid gas removal. The use of high gas velocities to reduce contact time also gives rise to entrainment and foaming problems. The present invention provides a method of achieving very favorable $H_2S$ selectivity over a wide range of feed rates which is not dependent on high superficial gas velocities, but instead employs a unique combination of processing steps as hereinafter described.

SUMMARY OF THE INVENTION

It has now been found that hydrogen sulfide may be selectively removed from a hydrogen sulfide and carbon dioxide-containing gaseous mixture in a highly effective manner by:

(a) contacting the gaseous mixture with an aqueous solution of a hydrogen sulfide-selective absorbent in an absorption column having fewer than 20 contacting trays which trays have an average dry tray pressure drop of from about 1.5 to about 5 inches thereby obtaining a treated gas containing less than 10% of the hydrogen sulfide present in the gaseous feed but more than 50% of the carbon dioxide present in said feed, and a hydrogen sulfide and carbon dioxide-enriched absorbent solution, (b) passing said hydrogen sulfide and carbon dioxide-enriched absorbent solution to a regenerating zone and stripping the absorbent solution to a hydrogen sulfide content which corresponds to an equilibrium loading for a $H_2S$ content having less than 50% of the hydrogen sulfide content of the treated gas, and (c) returning the regenerated absorbent solution into contact with the hydrogen sulfide and carbon dioxide-containing gaseous mixture.

The combined use of an absorption column having the specified number of trays with the critical dry tray pressure drop, coupled with deep-stripping of the aqueous absorbent solution, has been found to enable the removal of the hydrogen sulfide to low levels while allowing a substantial proportion, e.g., at least 50% and up to 70% by volume or more of the $CO_2$ in the incoming feed gas to remain in the treated gas.

By the term "dry tray pressure drop" as employed in the specification and claims, is meant the differential pressure across the tray resulting from the flow of gas under dry conditions, i.e., in the absence of any liquid on the tray. This can be calculated by deducting the pressure drop resulting from the liquid depth on the tray from the total differential pressure across the tray. "Average dry tray pressure drop" is the total dry tray pressure drop across the column divided by the number of trays. The dry tray pressure drop for a given tray is a function of the number and size of the orifices in the tray. Thus, the dry tray pressure drop can be increased by reducing the number of orifices, e.g., bubble caps, valves etc., or by restricting the size of the orifices, e.g., by using smaller bubble caps or valves, or by weighting the valves.

The present process utilizing relatively high tray pressure drop and deep stripping to achieve selective hydrogen sulfide removal, is to be distinguished from processes wherein high superficial gas velocities are employed in the column to reduce contact time. The present process is not dependent on the use of high superficial gas velocities, in fact, the use of higher dry tray pressure drops frequently results in a reduction in overall gas velocity in the column, although there may be an increase in velocity of the gas as it passes through the orifices of the individual trays due to the more restricted flow. Moreover, the use of high pressure drop across the individual trays makes possible operation over a wide range of feed rates. This is not possible for columns sized for good performance at high superficial velocities as these columns require the high velocities for good operation. Thus in the present process, selective hydrogen sulfide removal is accomplished through the short, but intimate, contacting of the feed with the absorbent solution, said intimate contacting being promoted by the use of the high dry tray pressure drop as contrasted to the use of high superficial gas velocity.

DESCRIPTION OF EMBODIMENTS

In accordance with the invention the selective removal of $H_2S$ is accomplished by intimately contacting the $H_2S$ and $CO_2$-containing gaseous mixtures with an absorbent liquid as hereinafter defined in an adsorption column having at the most 20 trays, e.g., from 3 to 20 trays, preferably 3-15 trays and more preferably from 3-10 trays. By this is meant actual contacting trays. The trays may be of the bubble cap or valve type or may be perforated plates or any conventional modifications thereof. Valve trays are generally preferred because of their greater flexibility in operation, i.e., the dry tray pressure drop can be increased by weighting the valves. The number and spacing of the valves (bubble caps, etc.) should be such as to promote maximum contact between the gas to be purified and the absorbent liquid with minimum bypassing. Tray designs which accomplish this are known to those skilled in this art and need not be described in detail herein.

Absorption may be effected at temperatures of from 0° to 140° C, preferably from 0° to 90° C, and pressures of atmosphere to 1200 psi or higher. Since the rate of absorption for most aqueous absorbent solutions varies inversely with temperature, it is generally desirable to operate the absorption step at as low a temperature as is economically feasible.

A particularly critical feature of the invention is that the average dry tray pressure drop be at least about 1.5 inches and preferably above about 2.0 inches per tray. The obtainment of equilibrium on an individual tray is generally governed by two opposing factors. One of these is the intimacy of vapor-liquid contact which should be maximized to increase absorption efficiency. On the other hand, if contacting or bubbling is too violent, liquid particles will be entrained in the ascending vapor bubbles and carried to the next tray thereby destroying whatever separation has been attained. Violent agitation also can result in foaming to a greater or lesser extent depending on the particular absorbent employed which also is disruptive of separation. As a result of these competing considerations, tray columns employed in acid-gas absorption processes are typically designed to operate at relatively low dry tray pressure drops, e.g., on the order of 0.3 to 1 inch per tray. It has now been found that trays having a relatively high dry tray pressure drop (e.g., from about 1.5 to about 5.0 inches, preferably from about 2 to about 4 inches per tray) can be employed with certain $H_2S$-selective absorbents under the conditions hereinafter described with surprisingly favorable results with regard to $H_2S$ selectivity.

Another important feature of the instant process is that the $H_2S$ and $CO_2$-enriched, i.e., "loaded", absorbent withdrawn from the absorption column be regenerated to very low $H_2S$ and $CO_2$ concentrations by heating and/stripping or equivalent operation. In accordance with the invention the loaded absorbent is stripped in the regeneration zone to a $H_2S$ content which corresponds to an equilibrium loading for a $H_2S$ content having less than 50%, and preferably less than 10%, of the $H_2S$ content of the treated gas. By equilibrium loading is meant that amount of $H_2S$ in the liquid absorbent which is in equilibrium with the amount of $H_2S$ in the treated gas leaving the absorber, at the temperature and pressure at top of the absorber. For example, in the case of a treated gas having an $H_2S$ concentration of 4ppm which is in equilibrium with a liquid absorbent such as employed in Example I having a $H_2S$ to amine mole ratio of $1 \times 10^{-5}$, the loaded absorbent would be stripped to a $H_2S$ to amine mole ratio of $0.7 \times 10^{-5}$ (which corresponds to an equilibrium value of 2ppm $H_2S$, or 50% of the $H_2S$ content of the treated gas). Equilibrium loading conditions for $H_2S$ and $CO_2$ at varying concentrations, temperatures and pressures for different hydrogen-selective absorbents are known or can be calculated by known methods and hence need not be detailed herein.

By "deep-stripping" the absorbent to the aforementioned low $H_2S$ concentration, the $CO_2$ concentration is also reduced to a very low concentration, e.g., at least below 0.02 moles of $CO_2$ per mole of active absorbent and generally less than 0.005 moles of $CO_2$ per mole of active absorbent. An absorbent liquid, which is only partially regenerated, for example, to a $CO_2$ content of 0.1 to 0.5 moles of $CO_2$ per mole of active absorbent, cannot be satisfactorily employed in the instant process since the absorption capacity of the absorbent would be insufficient for effective $H_2S$ removal under the hereinbefore described contacting conditions.

Generally speaking, any alkaline absorbent solution which has an appreciably greater affinity for $H_2S$ than for $CO_2$, (i.e., is "hydrogen sulfide-selective") can be employed in the process of the invention. Examples of such absorbents include alkali metal carbonates and phosphates such as potassium and sodium carbonate and phosphate and alkanolamines such as alkyl diethylanolamines, e.g., methyldiethanolamine, triethanolamine, or one or more dipropanolamines such as di-n-propanolamine or diisopropanolamine. Of the foregoing, aqueous methyldiethanolamine, triethanolamine and dipropanolamine solutions are preferred hydrogen-sulfide selective absorbents, particularly aqueous diisopropanolamine and methyldiethanolamine solutions. An especially preferred absorbent for treating gas at higher pressures, e.g., natural gas at pressures of 100 to 1200 psig, is an aqueous diisopropanolamine solution which additionally contains a minor amount of a physical solvent such as a substituted or unsubstituted tetramethylene sulfone. Either high purity diisopropanolamine may be used or technical mixtures of dipropanolamine such as are obtained as the by-product of diethanolamine production. Such technical mixtures normally consist of more than 90% by weight of diisopropanolamine and 10% by weight or less of mono- and tri-propanolamines and possibly trace amounts of diethanolamine. The concentration of the aqueous alkanolamine soltuion may vary between relatively wide limits. In general, the concentration of alkanolamine will be from 5 to 60% by weight, and preferably between 25 and 50% by weight. If a physical solvent is employed as a component of the absorbent liquid, it can be present in an amount of from 2 to 50% by weight, preferably from 5 to 25% by weight.

As previously mentioned, a preferred absorbent liquid for treating high pressure gas is an aqueous diisopropanolamine solution additionally containing a tetramethylene sulfone, the unsubstituted compound also being known as sulfolane. Suitable sulfolanes (substituted and unsubstituted) contain only from zero to two substituent radicals and they are alkyl of from 1 to 4 carbon atoms, with a total of 4 alkyl carbon atoms, the alkyl radicals being attached to different ring carbon atoms. Preferred substituted sulfolanes are those having methyl substituents. Representative substituted sulfolanes are 2-methyl sulfolane, 3-methyl sulfolane, 2,3-dimethyl sulfolane, 2,4-dimethyl sulfolane, 3,4-dimethyl sulfolane, 3-ethyl sulfolane and 2-methyl 5-propyl sulfolane. Sulfolane is a particularly preferred physical solvent for use in conjunction with diisopropanolamine absorbent.

As hereinbefore mentioned, it is possible to operate the present selective absorption process over a relatively wide range of temperatures, e.g., from 0° to 140° C. In many commercial applications such as the removal of $H_2S$ from natural gas to meet pipeline specifications, it would not be economical to operate the adsorption step at lower than ambient temperatures, in that the cost of refrigeration would exceed the benefits obtained due to increased absorption at the lower temperature. However, in certain special applications, such as the treatment of acid gas mixtures containing relatively high concentrations of $CO_2$ as compared to $H_2S$ to make them suitable as feed to a Claus plant, it has been found highly desirable to operate the absorption step at relatively low temperatures, i.e., below 30° C, and preferably below 10° C, even though refrigeration of the solvent and/or feed may be required. Acid gas streams suitable for processing to sulfur in a Claus plant generally should contain at least 25% $H_2S$, and preferably 50% $H_2S$, or higher. The present invention permits the preparation of such gases from acid gases containing, for example, as low as 5% $H_2S$ mixed with 94% $CO_2$. Thus, in one embodiment of the invention, an acid gas stream comprising primarily $CO_2$ and $H_2S$, in mole ratio ($CO_2/H_2S$) of 1:1 to 25:1, is contacted under the previously described contacting conditions with a hydrogen-sulfide selective absorbent at a temperature below 30° C, and preferably below 10° C, whereby a hydrogen-sulfided enriched gas mixture suitable for treatment in a Claus plant is obtained.

DESCRIPTION OF THE DRAWING

The invention will now be further described by reference to the accompanying drawing which is a simplified flow diagram of an acid-gas absorption process in accordance with the invention.

In the embodiment shown, a gas containing hydrogen sulfide and carbon dioxide is introduced through line 1 into the bottom of absorption column 2, equipped with five valve trays having an average dry tray pressure drop of 2.0 inches per tray. Regenerated absorbent liquid comprising 50% by weight diisopropanolamine, 35% by weight water and 15% by weight sulfolane is introduced into the top of the adsorption column through line 3 while "loaded" absorbent solution is withdrawn through line 4 and the treated gas having a substantially reduced $H_2S$ content and containing most of the $CO_2$ in the original feed stream, is withdrawn through line 5. The loaded absorbent solution is passed through heat exchanger 6 and subsequently introduced into the upper part of regeneration column 7 wherein it is stripped to a hydrogen sulfide content which corresponds to an equilibrium loading for a $H_2S$ content having less than 50% of the $H_2S$ content of the treated gas. The necessary heat is supplied by reboiler 8 and/or live steam introduced through line 9. The regenerated absorbent solution is recycled to the absorption column by means of line 3. Make-up absorbent solution can be added to this line or to the absorption column as required. The vapors resulting from stripping, comprising mainly $H_2S$, $CO_2$ and steam, are withdrawn from the top of the regeneration column through line 10 and are passed to gas-liquid separator 12 via condenser 11. $H_2S$ and $CO_2$ are withdrawn from the separator through line 13 while the condensed water vapor is withdrawn through line 14 and is recycled to the top of the regeneration column through line 15 and/or combined with the regenerated absorbent solution in line 3. The recovered $H_2S$ may be used for the manufacture of sulfur or sulfuric acid or other suitable purpose.

The following examples are now presented to further demonstrate the invention and the advantages thereof.

EXAMPLE I

The following example illustrates the application of the present invention to the treatment of natural gas containing a relatively large volume of $CO_2$ compared to $H_2S$, so as to selectively remove the $H_2S$ to meet pipeline specifications, in this case 0.25 grains $H_2S$/100SCF (0.0004% by volume) and 2.0% by volume $CO_2$. The $H_2S$ and $CO_2$ contents of the feed gas and treated gas are shown in the following table as well as the composition of the solvent and operating conditions.

Table A

| Feed Gas | |
|---|---|
| Volume, SCF/day | 200 million |
| $H_2S$, % by volume | 0.008 |
| $CO_2$, % by volume | 3.5 |
| Treated Gas | |
| $H_2S$, % by volume | 0.0004 |
| $CO_2$, % by volume | 2.0 |
| Percentage of original $H_2S$ concentration | 5 |
| Percentage of original $CO_2$ concentration | 57.1 |
| Composition of Solvent | |
| Diisopropanolamine, % by weight | 46 |
| Sulfolane, % by weight | 24 |
| $H_2O$, % by weight | 30 |
| Operating Conditions | |
| Absorption column (9ft ID) | |
|   Valve Trays, number | 5 |
|   Tray Spacing, inches | 36 |
|   Temperature, °F | 130 |
|   Pressure, psig | 1,000 |
|   Average dry tray pressure drop, inches | 3.0 |
| Stripping column (9ft. ID) | |
|   Valve Trays, number | 16 |
|   Tray Spacing, inches | 24 |
|   Temperature, Top, °F | 190 |
|   Bottom, °F | 250 |
| Lean solvent circulation rate, GPM | 850 |
| Depth of Stripping, $H_2S$ to amine, mole ratio | $0.7 \times 10^{-5}$ |

The above data indicate that $H_2S$ removal of 95% can be achieved, even at the relatively low concentration contained in the present feed, while $CO_2$ removal is less than 43%.

EXAMPLE II

The data in Table B below demonstrate the significance of the number of trays in the adsorption column and the depth of stripping of the loaded adsorbent on the selectivity of $H_2S$ removal relative to $CO_2$. The tabulation includes both empirical and calculated data based on the use of an absorbent liquid comprising 40–50% by weight diisopropanolamine, 20–30% by weight water and 10–30% sulfolane. Runs 6 and 7 are in accordance with the invention, while Runs 1–5 are not. The $H_2S$ and $CO_2$ concentration of the incoming natural gas stream and the percentage by weight $H_2S$ and $CO_2$ remaining after treatment are shown. The degree of selectivity is indicated by the difference between the $H_2S$ and $CO_2$ content remaining in the treated gas stream. At maximum selectivity the percentage of $H_2S$ remaining in the treated gas stream would be zero while the percentage of $CO_2$ (based on the amount of $CO_2$ in feed stream) would be 100%.

TABLE B

| Run No. | Number of Trays | Concentration of $H_2S$ and $CO_2$ in Feed Gas $H_2S$ % Vol. | $CO_2$ % Vol. | Column Conditions | Depth of Stripping[1] | Percentage of Original $H_2S$ and $CO_2$ Concentration Remaining in Treated Gas $H_2S$ % Vol. | $CO_2$ % Vol. |
|---|---|---|---|---|---|---|---|
| 1 | 27 | .003 | 25 | 53 atm at 40° C | Shallow | 6.5 | 12.5 |
| 2 | 21 | 1.9 | 6.3 | 50 atm at 40° C | Deep | 0.1 | 3 |
| 3 | 13 | 0.02 | 6.0 | 57 atm at 40° C | Shallow | 4.0, 3.0 | 20, 14 |
| 4 | 9 | 0.02 | 6.0 | 57 atm at 50° C | Shallow | 2.0, 5.5 7.0 | 20, 42 37.5 |
| 5 | 7 | 0.02 | 6.5 | 53 atm at 50° C | Shallow | 3.5 | 44 |
| 6 | 5 | .008 | 3.5 | 60 atm at 50° C | Deep | 2.2 | 55.5 |
| 7 | 3 | 5 | 70 | 1.2 atm at 40° C | Deep | 0.6 | 74 |

[1]Shallow stripping indicates stripping to a combined $H_2S$ and $CO_2$ concentration of $2 \times 10^{-2}$ to $5 \times 10^{-3}$ moles per mole of diisopropanolamine. With deep stripping, the lean absorbent contained from $1 \times 10^{-5}$ to $1 \times 10^{-7}$ moles $CO_2$ and $H_2S$ per mole of diisopropanolamine.

EXAMPLE III

The data contained in Table C below, demonstrate the pronounced effect of dry tray pressure drop on $H_2S$ selectivity in an absorption column having a small number of contacting trays and employing a deep-stripped solvent. The absorption column on which these calculated results are based has 3 valve trays, 9 ft. ID. The composition of the solvent employed in Runs 8–12 and the operating conditions of the absorption column in each of the runs are as follows: Feed gas (natural gas) rate, 200 million SCF/day; pressure, 800 psia; temperature, 120° F; solvent circulation rate, 600 GPM (gallons per minute); depth of stripping, $H_2S$ to amine ratio, $0.7 \times 10^{-5}$; composition of solvent, diisopropanolamine-45%w, water-30%, sulfolane-25%.

The $H_2S$ and $CO_2$ contents of the feed and treated gas, and the average dry tray pressure drop across the trays for the respective runs, are shown in Table C.

Table C

| Run No. | 8 | 9 | 10 | 11 | 12 |
|---|---|---|---|---|---|
| Feed Gas | | | | | |
|   $H_2S$, ppm | 100 | 100 | 100 | 100 | 100 |
|   $CO_2$, % by volume | 6.0 | 6.0 | 6.0 | 6.0 | 6.0 |
| Average dry tray pressure drop, inches | 0.3 | 1.0 | 1.5 | 2.0 | 4.0 |
| Treated Gas | | | | | |
|   $H_2S$, ppm | 72 | 70 | 10 | 4 | 2 |
|   $CO_2$, % by volume | 4.8 | 4.5 | 4.2 | 4.2 | 4.2 |
| Percentage of $H_2S$ and $CO_2$ in feed gas remaining in treated gas | | | | | |
|   $H_2S$ | 72 | 70 | 10 | 4 | 2 |
|   $CO_2$ | 80 | 75 | 70 | 70 | 70 |

The foregoing results indicate that very good selectivities obtained with the use of high average dry tray pressure drops in conjunction with a small number of contacting trays and deep-stripping of the solvent. While the treated gas in Runs 8 and 9, not in accordance with the invention, contained most of $CO_2$ present in the feed gas, overall selectivity is poor in that the majority of the $H_2S$ in the feed gas is also retained. If the number of trays in these runs were substantially increased to improve the $H_2S$ removal without varying the dry tray pressure drop, the amount of $CO_2$ removed would be correspondingly increased, hence there would be little or no improvement in selectivity.

EXAMPLE IV

This example illustrates the application of the instant selective $H_2S$ removal process to the treatment of $H_2S$ and $CO_2$— containing gases obtained by the catalytic hydrogenation of Claus plant tail gas. By operating in accordance with the invention as shown in Table D, it can be seen that it is possible to extract substantially all of the $H_2S$ from the hydrogenated Claus tail gases for recycle to the Claus unit, while the bulk of the $CO_2$ in the hydrogenated tail gas is not extracted and thus can be passed to the atmosphere.

Table D

| | |
|---|---|
| Feed gas (hydrogenated Claus plant tail gas) | |
| $H_2S$, % by volume | 2.12 |
| $CO_2$, % by volume | 5.71 |
| Treated gas $H_2S$, % by volume | 0.19 |
| $CO_2$, % by volume | 4.67 |
| Percentage of original $H_2S$ | |

Table D-continued

| | |
|---|---|
| concentration | 9 |
| Percentage of original $CO_2$ concentration | 82 |
| Composition of solvent | |
| Diisopropanolamine, % by weight | 27.0 |
| $H_2O$, % by weight | 73.0 |
| Operating Conditions | |
| Absorption column | |
| Valve trays, number | 7–9 |
| Spacing, inches | 30 |
| Temperature, °F | 110–115 |
| Pressure, psia | 14.8 |
| Average dry tray pressure drop, inches | 2.0 |
| Stripping column | |
| Valve trays, number | 20 |
| Temperature, Top, °F | 210 |
| Bottom, °F | 250 |
| Pressure, Top, psia | 24 |
| Bottom, psia | 27 |
| Lean solvent circulation, moles/mole of feed gas | 3.5 |
| Depth of stripping, $H_2S$ to amine, mole ratio | 0.002 |

What is claimed is:

1. A process for selectively removing hydrogen sulfide from a gaseous mixture containing hydrogen sulfide and carbon dioxide which comprises:
    (a) contacting said gaseous mixture with a hydrogen sulfide-selective aqueous alkanolamine absorbent solution in an absorption column having from 3 to 20 contacting trays, said trays having an average dry tray pressure drop of from about 1.5 to about 5 inches per tray, thereby obtaining a treated gas containing less than 10% of the hydrogen sulfide present in the gaseous feed but more than 50% of the carbon dioxide present in said feed, and a hydrogen sulfide and carbon dioxide enriched-absorbent solution,
    (b) passing said hydrogen sulfide and carbon dioxide-enriched absorbent solution to a regenerating zone and stripping said absorbent solution to a hydrogen sulfide content which corresponds to an equilibrium loading for a $H_2S$-content having less than 50% of the hydrogen sulfide content of the treated gas, and
    (c) returning said regenerated absorbent liquid into contact with the hydrogen sulfide and carbon dioxide containing gaseous mixture.

2. The process of claim 1 wherein the selective alkanolamine absorbent is methyldiethanolamine, triethanolamine or diisopropanolamine.

3. The process of claim 1 wherein the aqueous absorbent solution additionally contains from 2 to 50% by weight of a cyclotetramethylene sulfone and the gaseous mixture comprises natural gas.

4. The process of claim 2 wherein the gaseous mixture comprises hydrogenated tail gas from a Claus plant for converting $H_2S$ to elemental sulfur.

5. The process of claim 4 wherein the absorption column has from 3 to 15 trays and said trays have an average dry tray pressure drop of from about 2 to about 4 inches per tray.

6. The process of claim 3 wherein the cyclotetramethylene sulfone is sulfolane.

7. The process of claim 5 wherein the aqueous absorbent solution contains from 5 to 60% by weight of diisopropanolamine.

8. The process of claim 6 wherein the gaseous mixture comprises natural gas.

9. The process of claim 7 wherein the hydrogen sulfide and carbon dioxide enriched absorbent solution is stripped to a $CO_2$ content of less than 0.005 moles of $CO_2$ per mole of diisopropanolamine.

10. The process of claim 8 wherein the aqueous absorbent solution contains from 5 to 60% by weight diisopropanolamine.

11. The process of claim 10 wherein the absorption column has from 3 to 10 trays.

12. The process of claim 11 wherein the average dry tray pressure drop per tray is from about 2 to about 4 inches per tray.

13. The process of claim 12 wherein the aqueous absorbent solution contains from 5 to 25% by weight sulfolane.

14. The process of claim 1 wherein the gaseous mixture comprises primarily $CO_2$ and $H_2S$ in a mole ratio of 1:1 to 25:1 and wherein the contacting of said gaseous mixture with said hydrogen sulfide-selective absorbent solution is conducted at a temperature below 30° C.

* * * * *